UNITED STATES PATENT OFFICE.

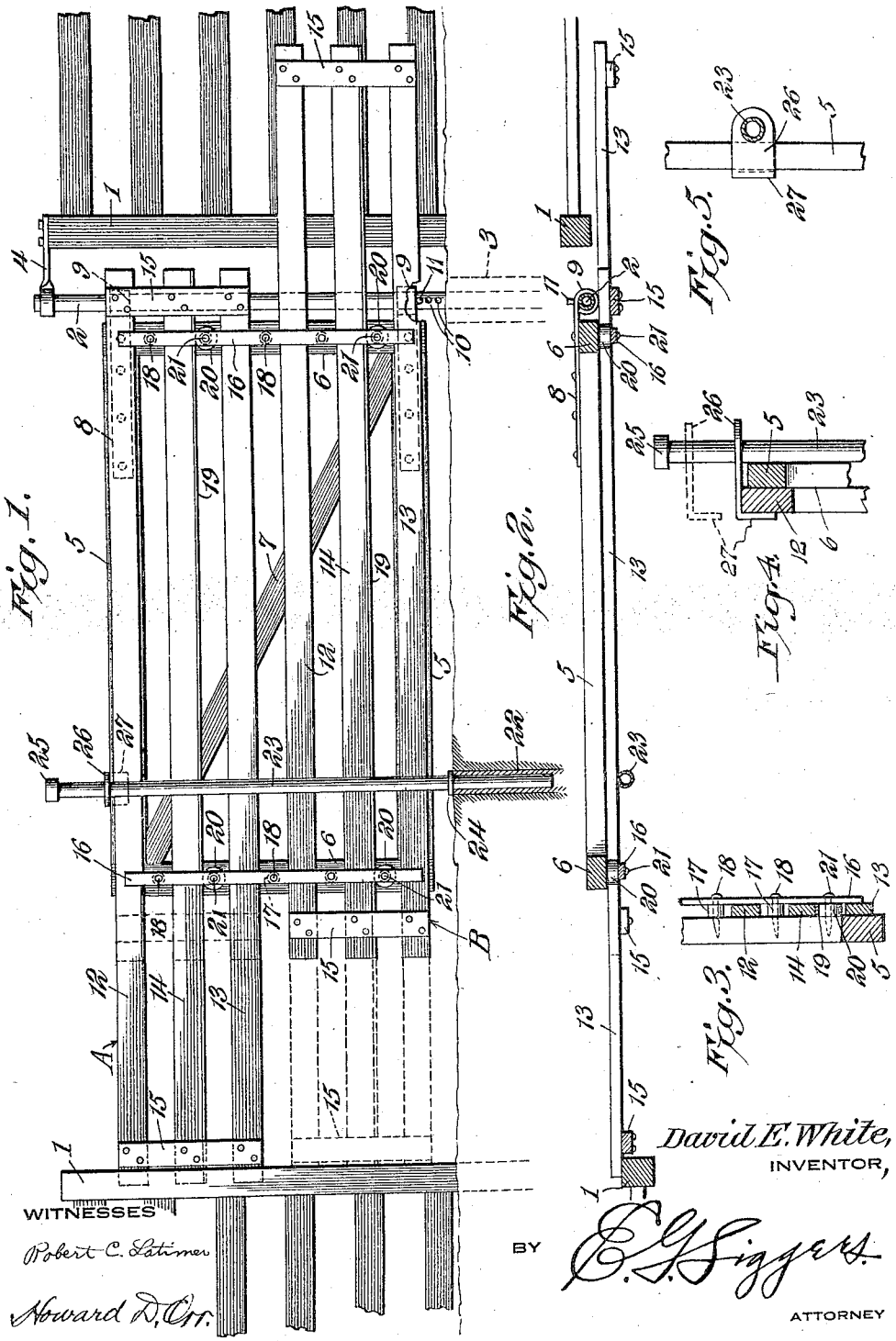

DAVID E. WHITE, OF WINCHESTER, KANSAS.

FARM GATE.

1,410,980.

Specification of Letters Patent. Patented Mar. 28, 1922.

Application filed May 22, 1920. Serial No. 383,472.

*To all whom it may concern:*

Be it known that I, David E. White, a citizen of the United States, residing at Winchester, in the county of Jefferson and State of Kansas, have invented a new and useful Farm Gate, of which the following is a specification.

This invention relates to gates, and more particularly to that class known as farm gates.

The object is to improve that type of gates which comprises a main supporting gate frame hingedly mounted to swing in the ordinary manner upon a gate post, and a pair of supplemental, longitudinally slidable members adjustably mounted thereon, one above the other, for separate movement, so as to render the gate capable of being slightly opened for the passage of a small animal, such as a hog or a sheep, by opening the lower sliding member, or which may be adjusted to pass a cow or a horse by opening both members, or which, by swinging the entire gate upon its hinges will allow the passage of a team.

Another object is to provide means for holding the main gate frame in an intermediate position, such means comprising a removable post mounted in the ground intermediate of the gate posts in a position to arrest the closing movement of the gate at the desired point, and having a latch for engaging the gate to prevent its retrograde movement, the said post and latch freely permitting the individual sliding movement of the supplemental members.

A full and complete understanding of the invention may be obtained from a consideration of the following detailed description taken in connection with the accompanying drawing, it being understood that while the latter shows a practical form of the invention, the same may be changed or modified so long as such changes or modifications mark no material departure from the salient features of the invention as specifically pointed out in the appended claims.

In the drawing, in which similar reference characters designate corresponding parts throughout the several figures:—

Fig. 1 is an elevation of a gate constructed in accordance with the invention, the lowermost supplemental section being shown in slightly open position, as for the passage of a small animal.

Fig. 2 is a horizontal sectional view of the same.

Figs. 3, 4 and 5 are detail sectional views.

It is often desirable where animals of different kinds are gathered in farm yards or pastures, to allow the free passage of small animals such as sheep or hogs, and at the same time prevent cows, horses or other larger animals from escaping. The gate of the present invention is designed to accomplish this result by the employment on a gate frame of ordinary construction having full swinging action to allow the passage of a team, of a pair of supplemental sliding sections mounted thereon, one above the other, in such a manner as to be separately slid back any desired distance, or which may be slid back together, the entire device, at the same time, being capable of swinging upon the hinge post.

In the drawing, 1—1 indicate a pair of fixed posts spaced apart the desired distance to freely allow the passage of a team or vehicle of maximum width, such as a load of hay, etc., the gate, by reason of its construction, making this distance greater than is possible with ordinary gates. The posts 1—1 support the usual fence panels, and may be mounted in the ground in any desired manner, and are preferably of wood. In spaced relation to one of the posts 1—1, there is located a vertically disposed gate post 2, preferably formed of a length of pipe mounted in a concrete base 3, and of a length substantially equal to the adjacent post 1, the upper end of the gate post 2 being held to the fence post 1 by a suitable metallic bracing strap 4.

The main gate frame which is preferably formed of wood, comprises the upper and lower longitudinally disposed rails 5—5, joined at their ends by vertically disposed rails 6—6 to form a rectangular frame, braced and strengthened by a diagonally disposed truss bar 7, the several parts of the gate frame or section being secured together by any desired means such as strap irons wherever necessary. The length of the gate frame is preferably substantially two-thirds the distance between the fence posts 1—1, and is of a height sufficient to prevent the larger animals from vaulting the same.

The longitudinally disposed rails 5—5 of the gate frame carry strap iron hinges 8—8 formed into eyes 9—9 which surround the hinge post 2, and the latter, which extends somewhat above the gate frame, is provided, at its lower end, with a series of perforations 10, for the passage of a suitable pin 11, which is located beneath the lowermost eye 9 and is adapted to carry the weight of the entire gate. This pin may be adjusted in any one of the holes 10 so as to raise or lower the entire gate to clear obstructions on the ground, it being often necessary when there are snow drifts to raise the gate a considerable distance above the ground in order to permit of its swinging action, as will be readily understood.

A pair of upper and lower supplemental members or sections A and B are slidably mounted upon one side of the gate frame, said sections A, B being substantially equal in length to the distance between the posts 1—1 and thus considerably longer than the length of the main gate frame and, being located at one side of the said gate frame, are consequently free to be slid back past the post 1 adjacent to the hinge without striking the same in such sliding movement.

The slidable supplemental members or sections A and B each comprise upper, lower and intermediate rails 12, 13 and 14, respectively, the same being preferably formed of wooden planks somewhat thinner than the rails of the main gate frame and joined, adjacent to their ends, by vertically disposed bars 15, which serve to rigidly hold the rails 12, 13 and 14 in their spaced relation.

The sections A and B are adapted to be retained in their positions against the sides of the main gate frame or section by strap irons 16 vertically disposed upon the vertical end rails 6—6 of the main gate frame, and held in spaced relation thereto by spacing washers 17 traversed by suitable fastening devices 18 entering said vertical rails 6—6.

The rails 12, 13 and 14 are adapted to freely slide between the main gate frame and the irons 16, the latter effectually preventing the sections A and B from falling from their position, and in order to facilitate the sliding movement of the said sections, one of the rails, preferably the intermediate one 14, is provided with a suitable metal strip constituting a track 19, suitably secured to the lower edge thereof, and adapted to ride upon rollers 20 located between the rails 6—6 and the irons 16, said rollers being mounted to revolve upon fastening devices 21.

About midway between the posts 1—1 there is sunk into the ground a metallic tube forming a socket 22 into which the intermediate or abutment post 23 in the form of a metal pipe or rod is adapted to be seated, the said post having a stop collar 24 adapted to rest upon the socket 22 and maintain the post at its proper elevation. The post 23 extends above the main gate frame, and is provided at its top with a suitable cap 25, and mounted on the post is a slidable latch or keeper in the form of a plate 26 having a suitable aperture to receive the said post and to freely slide up and down upon the same, the cap 25 being adapted to permit the keeper to be raised sufficiently to rest upon the upper edge of the top rail 5 of the main gate frame, when the latter is in its elevated position upon the hinge post 2 and supported therein by the pin 11.

The keeper 26 has a down-turned lip 27 adapted to engage against the side of the top rail 5 opposite the abutment post 23, and to hold the same thereagainst at all elevations, and it will be seen that by merely raising the keeper, the entire gate may be swung upon its hinges when it is desired to pass a team, and it will be further noted that when the keeper 26 is thus engaged with the main gate frame, the ends of the rails 12, 13 and 14 of the sections A, B where projecting beyond the vertical bars 15 farthest removed from the hinge post 2, are adapted to bear against the face of the adjacent fence post 1, and to assist the abutment post in maintaining the gate in its closed position.

While two of the slidable sections A, B are illustrated in the drawing, it will be understood that only one of the same may be mounted on the main gate frame, in which event the said section will be of equal height with said frame, and in either event it will be noted that the longitudinal rails 12, 13 and 14 which overlie the gate frame at all times, obviate the necessity for any longitudinal strips to be built into said frame.

From the foregoing, it will be seen that a simple, cheaply manufactured, and easily operated gate has been provided, which may be elevated and supported to swing wide open to pass full width vehicles, or that the sliding sections may be singly or both opened to pass large or small animals.

What is claimed is:

1. In a gate, the combination with a hinge post, a main gate frame hingedly mounted on said post for swinging movement, one or more slidable supplemental gate sections mounted on and carried by said gate frame and adapted to extend from the latter in either the open or closed position, an abutment post located in the gate opening intermediate of the length of the gate and at one side of the same when it is in closed position, and a vertically slidable keeper mounted on the abutment post and adapted to engage with the upper rail of the main gate frame to hold the latter from swinging on its hinges and maintain the gate in closed position, whereby upon disengaging the keeper from the gate frame, the latter with the section or sections may be swung to one side, and when said keeper is in engagement with the gate frame, the supplemental section or sections may be individually opened as desired, without disturbing the main gate frame.

2. A gate comprising a pair of fixed posts, a hinge post, a main gate frame hingedly mounted at one end to the hinge post for swinging movement between the fixed posts, said gate frame being adapted to be supported in elevated position, rollers carried by the main gate frame on one side thereof, one or more slidable supplemental gate sections carried by the gate frame and mounted on the rollers in normally extending relation to said frame and adapted when closed to bear against the post opposite the hinge post, an abutment post removably mounted in the ground between the fixed posts and having a vertically slidable keeper mounted thereon to engage the upper rail of the gate frame to maintain the latter in longitudinal alinement between the said posts.

In testimony, that I claim the foregoing as my own, I have hereto affixed my signature.

DAVID E. WHITE.